United States Patent Office 3,728,311
Patented Apr. 17, 1973

3,728,311
POLYUREAS, POLYURETHANES AND POLY-
AMIDES BASED ON A TETRA-OXO DIAMINE
COMPONENT
Chung Ho Park, Wilmington, Del., assignor to E. I. du
Pont de Nemours and Company, Wilmington, Del.
No Drawing. Filed Dec. 16, 1971, Ser. No. 208,931
Int. Cl. C08g 20/02, 22/02, 22/16
U.S. Cl. 260—77.5 C                                16 Claims

ABSTRACT OF THE DISCLOSURE

Disclosed herein are polymers of the structure

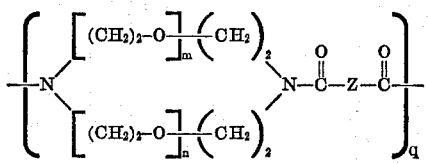

wherein:

$m$ and $n$, alike or different, are 1 to 5,
$q$ is 25 to 1000; and
$Z$ is selected from:
 divalent hydrocarbon groups containing from 2 to
  20 carbon atoms,
 hydrocarbondioxy groups, —O—Z'—O—, contain-
  ing from 2 to 20 carbon atoms, and
 hydrocarbondiamino groups, —NH—Z'—NH—,
  containing from 2 to 20 carbon atoms; said Z
  and Z' groups being composed of divalent ali-
  phatic groups, arylene groups or combinations
  thereof.

BACKGROUND OF THE INVENTION (1) Field of the invention

This invention relates to polymers containing macro-
cyclic polyethers.

(2) Description of the prior art

B. Dietrich et al. [Tetrahedron Letters, No. 34, 2885
(1969)] and Chem. Communications 1970, 1055, de-
scribe the preparation of the diamine

wherein X and Y are the same or different and are se-
lected from sulfur and oxygen.

SUMMARY AND DETAILS OF THE INVENTION

This invention concerns novel polymers of the structure

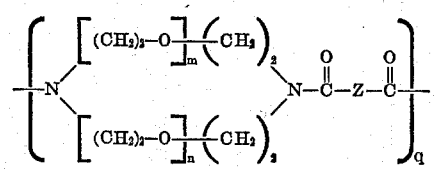

wherein:

$m$ and $n$, alike or different, are 1 to 5, preferably 1 to 3;
$q$ is 25 to 1000; and
$Z$ is selected from:
 divalent hydrocarbon groups containings from 2 to
  20 carbon atoms,
 hydrocarbondioxy groups, —O—Z'—O—, contain-
  ing from 2 to 20 carbon atoms, and
 hydrocarbondiamino groups, —NH—Z'—NH—,
  containing from 2 to 20 carbon atoms; said Z and Z' groups being composed of divalent aliphatic
groups, arylene groups or combinations thereof.

Also included within the scope of this invention are
copolymers made from more than one diamine and/or
diacid, and copolymers containing aliphatic, nonmacro-
cyclic diamino polyether moieties. The term "polymer"
as employed herein, depending on the context, is meant to
include copolymers, terpolymers, etc.

Process

B. Dietrich et al., Tetrahedron Letters, No. 34, 2885
(1969) teach the preparation of 1,10-diaza-4,7,13,16-
tetraoxacyclooctadecene: The reaction of the dioxadi-
amine I with triglycolic acid chloride II (both obtained
by methods in the literature) under conditions of high
dilution accordng to Stetter and Marx (Ann., 1957, 607,
59) gave the macrocyclic diamide III (M.P. 111–112°;
yield 80%) which by reduction with aluminum hydride in
tetrahydrofuran under reflux, gave the macrocyclic tetra-
oxa-diamine IVa (M.P. 115–116°; yield 75%).

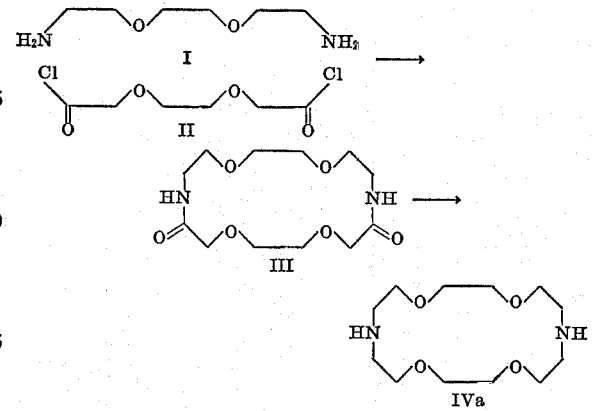

The method is taught to be general.

Several well-known procedures are available for effect-
ing the condensation reactions of this invention. The
most general procedure for the practice of this invention
is the interfacial polymerization technique that was first
reported by E. L. Wittbecker and P. W. Morgan [J. Poly.
Sci., 40, 289 (1960)]. This preferred procedure depends
on solubility differences of the reactants. The reaction
occurs at the interface of dibasic acid halide in a water
immiscible organic solvent and an aqueous solution of
a diamine.

Alternatively, polyurethane and polyureas can be pre-
pared by the addition reactions:

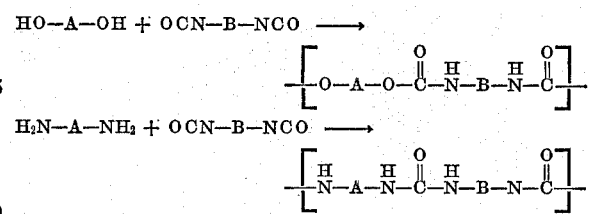

and although the reactions are not condensations in the
classic literal sense, the polymers are commonly considered
to be condensation polymers on the basis of structure,
since they are theoretically derivable from other reac-
tions (W. R. Sorenson and T. W. Campbell, Preparative
Methods of Polymer Chemistry, Interscience, ed. 2, 1968,
p. 69). The hydrogen addition reactions of this type are
generally carried out by combining solutions of the re-
actants in suitable miscible solvents in a reactor that
is protected against entrance of moisture.

A melt polymerization technique can be employed al-
though it is seldom preferred. See, for instance, H. Mark and G. S. Whitby, collected papers of Wallace H. Carothers, Interscience, New York (1940) for process details.

DESCRIPTION OF THE PREFERRED EMBODIMENTS

The following examples are meant to illustrate, not to limit, the invention. In these examples, glass transition temperatures (Tg) were determined by differential thermal analysis. Conventional elongation, modulus and tensile measurements were made using an Instron tensile tester on strips cut from pressed or cast films. Temperatures are in degrees centigrade.

EXAMPLE 1

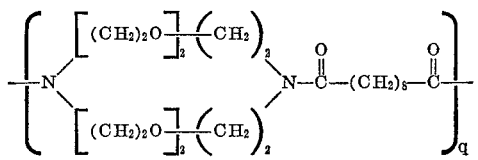

wherein $q$ is between 25 to 1000.

A solution of 11.95 g. (0.05 mol) of sebacyl chloride in 50 ml. of methylene chloride was added in one portion to a rapidly stirred solution of 13.12 g. (0.05 mol) of 1,10-diaza-4,7,13,16-tetraoxacyclooctadecane and 10.6 g. (0.10 mol) of $Na_2CO_3$ in 100 ml. of water. After one minute of stirring, the $CH_2Cl_2$ was evaporated to give an elastic, rubbery solid. The solid was washed continuously with water until chloride-free and dried in vacuum at room temperature to give an elastic rubbery material (19.7 g. or 92% yield) with a softening point of 150–160° C. The freshly made polyamide was soluble in formic acid but on standing lost its elasticity to give a tough polymer that was soluble in concentrated $H_2SO_4$.

EXAMPLE 2

Example 1 was repeated except for the use of sublimed 1,10-diaza-4,7,13,16-tetraoxacyclooctadecane. The resulting elastomeric polyamide amounted to 17.1 g. or 80% yield and was easily soluble in formic acid. Inherent viscosity of the reprecipitated polymer was 5.94 (0.1% in formic acid) with a Tg of −11° (starts to soften at 140° C.). The pressed film tends to stick together and the cast film sticks tenaciously to glass showing the adhesive properties of the novel polymer.

A 27-mil pressed film showed the following mechanical properties: elongation=587%; modulus=99 p.s.i. and tensile strength=56 p.s.i. The pressed film was obtained by heating 3 g. of the polymer in a Carver press at a temperature of 140° and a pressure of 3000 lbs. for 2 min. The cast film was obtained by spreading a 5% polymer solution in hexafluoroisopropanol onto a glass plate with a doctor knife.

EXAMPLE 3

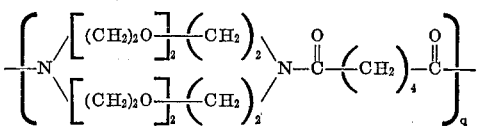

wherein $q$ is between 25 to 1000.

Example 2 was repeated with the substitution of an equivalent amount of adipyl chloride for the sebacyl chloride. The resulting water-soluble polymer was dialyzed in cellulose acetate tubing until chloride-free and dried in vacuum (water aspirator). The polyamide amounted to 3.55 g., and had an inherent viscosity of 2.53 (0.1% in formic acid). No accurate yield was determined since the polymer was difficult to recover from the flask. The pressed film tends to stick together demonstrating its cohesive properties.

EXAMPLE 4

A copolymer containing random units of

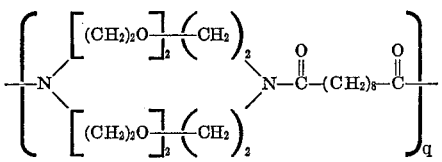

and

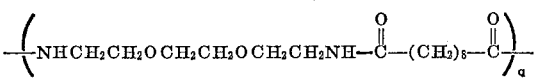

wherein $q$ is between 25 to 1000.

A random copolymer was prepared following the procedure of Example 1 and employing the following reactants: 3.28 g. (0.0125 mol) of 1,10-diaza-4,7,13,16-tetraoxacyclooctadecane, 1.75 g. (0.0125 mol) of 1,8-diamino-3,6-dioxaoctane and 5.3 g. (0.05 mol) of $Na_2CO_3$ (100 ml. of water), 5.98 (0.025 mol) of sebacyl chloride in 20 ml. of $CH_2Cl_2$.

The polymer was washed with water in the blender. This yielded 5.6 g. (75% yield) of a tough, rubber that was soluble in formic acid. Tg=−8° C. Inherent viscosity was 2.78 (0.1% in formic acid).

EXAMPLE 5

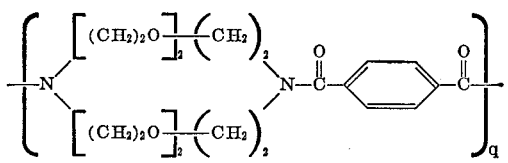

wherein $q$ is between 25 to 1000.

Example 1 was repeated using the reactants: 10.16 g. (0.05 mol) of terephthaloyl chloride in 75 ml. of $CH_2Cl_2$; 13.12 g. (0.05 mol) of 1,10-diaza-4,7,13,16-tetraoxacyclooctadecane and 10.6 g. (0.10 mol) of $Na_2CO_3$ in 100 ml. of $H_2O$.

The above reactants were stirred for 10 minutes and the polymer was washed in the blender with water. This yielded 13.8 g. (70.5%) of a light yellow granular polyamide solid, $\eta_{inh}$=0.59 (0.1% in formic acid). A pressed film was transparent, tough and strain-free. The polymer was soluble in m-cresol and hexafluoroisopropanol.

EXAMPLE 6

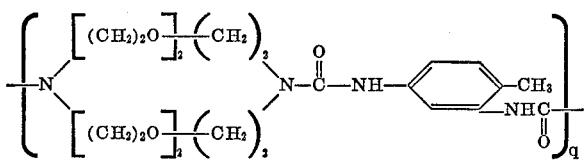

wherein $q$ is between 25 to 1000.

A solution of 3.60 g. (0.02 mol) or 2,4-toluene diisocyanate in 120 ml. of 30:70 v./v. chloroform/tetramethylene sulfone was added on one portion to a stirred solution of 5.25 g. (0.02 mol) of 1,10-diaza-4,7,13,16-tetraoxacyclooctadecane in 80 ml. of chloroform/tetramethylene sulfone (30:70 v./v.) and the mixture stirred for 7 minutes. The mixture was then treated in turn with 100 ml. of a 4% aqueous solution of butylamine and 200 ml. of water.

Some polymer was precipitated by pouring a small part of the reaction mixture into 1 liter of water. The rest of the polymer was precipitated by addition to 800 ml. of water, where an oily layer of polymer-rich material separated. After evaporation of chloroform, the layer was continuously extracted with water to give a dried, granular polyurea which, when combined with the first precipitate, weighed 5.4 g. (61.2% yield). The pressed film was transparent and brittle; $\eta_{inh}$=0.16 (0.1% in formic acid).

Any of the diisocyanates listed below can be substituted for the 2,4-toluene diisocyanate in the procedure of this example to obtain the corresponding polyureas, all useful as described herein.

| | |
|---|---|
| Ethylene diisocyanate | OCH—CH$_2$CH$_2$—NCO |
| 1,5-pentamethylene diisocyanate | OCN—(CH$_2$)$_5$—NCO |
| 1,4-(2-butenylene) diisocyanate | OCN—CH$_2$C=CHCH$_2$—NCO |
| 1,5-(2,2-dimethyltetramethylene) diisocyanate | OCN—CH$_2$C(CH$_3$)$_2$(CH$_2$)$_2$—NCO |
| 1,12-dodecamethylene diisocyanate | OCN—(CH$_2$)$_{12}$—NCO |
| p-Xylylene diisocyanate | 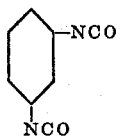 |
| 1,4-cyclohexylenedimethyl diisocyanate | |
| 1,4-cyclohexylenediethyl diisocyanate | |
| 1,4-naphthylenedimethyl diisocyanate | |
| 1,3-cyclohexylene diisocyanate | |
| Methylenebis(4-cyclohexyl isocyanate) | |
| 4-isocyanato-benzyl isocyanate | |
| β-(p-Isocyanatophenyl) ethyl isocyanate | |
| 1,5-tetrahydronaphthylidene diisocyanate | |
| m-Phenylene diisocyanate | |
| 1-methyl-2,4-phenylene diisocyanate | |
| 1,4-naphthylene diisocyanate | |
| 4,4'-biphenylene diisocyanate | |

The useful diisocyanates set out above are reported in W. Siefken, Ann. 562, 122 (1949).

EXAMPLE 7

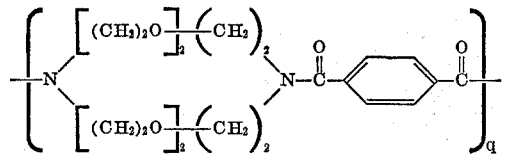

wherein $q$ is between 25 to 1000.

A solution of 10.15 g. (0.05 mol) of sublimed terephthaloyl chloride in 40 ml. of chloroform was added to a rapidly stirred solution of 14.43 g. (0.055 mol) of 1,10-diaza-4,7,13,16-tetraoxyacyclooctadecane and 0.10 mol of sodium hydroxide in 170 ml. of water. Stirring was continued for 5 minutes and the resulting mixture was precipitated with 1.5 liters of acetone. The polymer was filtered, washed with water until chloride-free, finally rinsed with acetone, and dried in vacuum to give 14.30 g. of polymer (73% yield) with an inherent viscosity of 1.39 (0.1% solution in formic acid) and with no apparent glass transition temperature. A tough, transparent film pressed at 200° C. gave the following mechanical properties: elongation=73%; modulus=217,053 p.s.i. and tensile strength=7300 p.s.i.

EXAMPLE 8

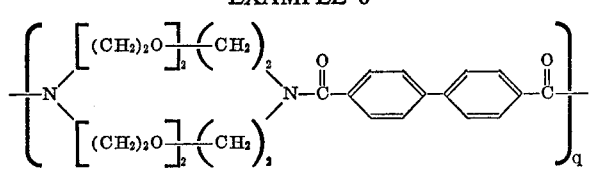

wherein $q$ is between 25 to 1000.

A solution of 13.96 g. (0.05 mol) of sublimed bibenzoyl chloride in 100 ml. of chloroform was added to a rapidly stirred solution of 13.12 g. (0.05 mol) of 1,10-diaza-4,7,13,16-tetraoxyacyclooctadecane and 0.10 mol of sodium hydroxide in 150 of water. Stirring was continued for 15 minutes. After the water was decanted, the polymer was washed twice in the blender, then in the filter until chloride-free, and dried in vacuo to give 23.4 g. of polymer (100% yield) with an inherent viscosity of 1.22 (0.1% solution in m-cresol). A cast film (10% solution in formic acid) gave the following mechanical properties: elongation=138%; modulus=231,970 p.s.i. and tensile strength =7027 p.s.i.

EXAMPLE 9

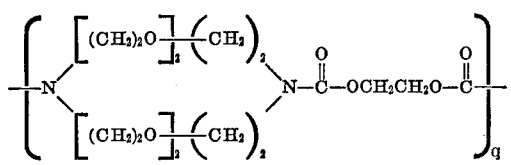

wherein $q$ is between 25 to 1000.

A solution of 9.35 g. (0.050 mol) of distilled ethylene-bis-chloroformate in 30 ml. of methylene chloride was added to a rapidly stirred solution of 13.64 g. (0.052 mol) of 1,10-diaza-4,7,13,16-tetraoxycyclooctadecane and 0.10 mol of sodium carbonate in 110 ml. of water. After 4 minutes stirring, the reaction mixture was poured into 500 ml of water. This was heated until most of the methylene chloride was evaporated. The polymer was washed in the blender, filtered, washed with warm water, and dried at 50° C. in vacuo to give 9.85 g. (52% yield) polymer. Properties of the polyurethane are: inherent viscosity =1.24 (0.1% solution in m-cresol); Tg=5°, good solubility in chloroform, hexafluoroisopropanol, m-cresol, and formic acid.

EXAMPLE 10

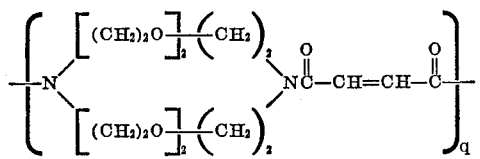

wherein $q$ is between 25 to 1000.

A solution of 7.64 g. (0.05 mol) of distilled fumaryl chloride in 50 ml. of methylene chloride was added to a solution of 13.12 g. (0.05 mol) of 1,10-diaza-4,7,13,16-tetraoxacyclooctadecane and 0.1 mol of sodium hydroxide in 120 ml. of water.

The reaction mixture was stirred for 5 minutes and the thermoplastic polyamide was washed in the blender with water. The dried polymer weighed 9.95 g. (58% yield). Polymer properties are: inherent viscosity=2.36 (0.1% in formic acid); no observable Tg; soluble in sulfuric acid, partially soluble in m-cresol, hexafluoroisopropanol, and formic acid.

EXAMPLE 11

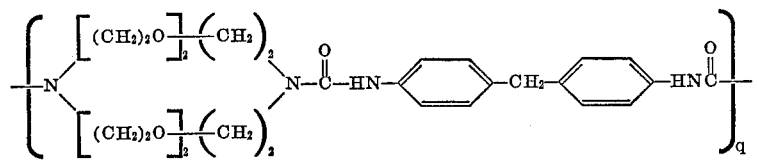

A solution of 5.0 g. (0.02 mol) of methylenebis(4-phenyl isocyanate) in 120 ml. of chloroform was added to a rapidly stirred solution of 5.25 g. (0.02 mol) of 1,10-diaza-4,7,13,16-tetraoxacyclooctadecane in 40 ml. of chloroform. Stirring was continued for 1 hour, after which the polymer solution was poured into 500 ml. of hot water. The mixture was further heated to evaporate chloroform. The water was decanted and the residual chloroform concentrate precipitated by addition to vigorously stirred hexane. The fibrous white solid polymer was washed with hexane and dried in vacuo to give 9.45 g. of polymer (92% yield). Polymer properties are: inherent viscosity =1.10 (0.1% solution in formic acid); Tg=40°; soluble in chloroform, hexafluoroisopropanol, formic acid and m-cresol.

EXAMPLE 12

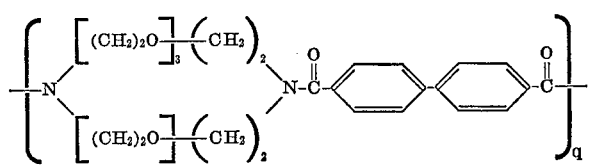

wherein $q$ is between 25 to 1000.

Using the procedure of Example 8, 1,7-diamino-4,10,13,16-tetraoxacyclooctadecane (2.63 g., 0.01 mol) was polymerized with bibenzoyl chloride. The dried polymer weighed 3.9 g. (83% yield). Properties of the polymer are: inherent viscosity of a 0.1% solution in m-cresol =0.96; soluble in chloroform, hexafluoroisopropanol, m-cresol and formic acid. Polymer is thermoplastic in nature (Tg=88°).

UTILITY

The novel polymers taught herein have the very desirable ability to form complexes with a wide variety of cations such as those derived from the alkali metals and the alkaline earth metals. The novel polymers combine the physical strength of high polymers with the coordinating ability of hetero atoms such as O, S, N, B, P, as well as of such functional groups as

—CONH—, —CONR—, —NHCONH—,
—NRCONH—, —NRCONR—, —COO—, and their sulfur analogs. Because of their coordinating ability, the novel polymers are useful in filters and diffusion membranes as will be obvious to those skilled in the art.

EXAMPLE A

A 10% chloroform solution of the polymer of Example 8 was filtered through a 0.45μ silver plate using a 10-mil doctor knife. The resulting clear, transparent film was baked overnight at 80° C. and stripped off at room temperature. One-half of the film was further baked at 150° C. for 3 hours. The unbaked film had a $H_2/CH_4$ selectivity of 196 at 1014.7 lbs. pressure and the baked film a selectivity of 594. The $O_2/N_2$ selectivity for both films was 8 at 1014.7 lbs. pressure.

EXAMPLES B, C AND D

Ten percent chloroform solutions of the polymers of Examples 2, 3 and 9 were cast onto a glazed paper using a 6-mil doctor knife. The castt films had the following H₂/CH₂ selectivities.

Film:                          H₂/CH₄
- Polymer of Example 2__ 23 at 114.7 p.s.i. pressure
- Polymer of Example 3__ 102 at 114.7 p.s.i. pressure
- Polymer of Example 9__ 83 at 114.7 p.s.i. pressure

EXAMPLE E

An asymmetric film of the polymer of Example 8 was prepared by casting a filtered 10% polymer solution in formic acid onto a glass plate with a 20-mil doctor knife, quenching in water and letting the film stand in water for 16 hours to remove the acid. The asymmetric film was used for separating a 5% solution of formic acid in water. The film retained 50% of the acid at a flow rate of 0.8 gal./ft.² day.

EXAMPLE F

The asymmetric film of Example E retained 13% of the ethanol in separating a 5% ethanol solution in water with a flow rate of 0.937 gal./ft.² day at 1600 p.s.i.

EXAMPLE G

A solution of the polymer of Example 2 was cast on paper using a doctor knife as in Example A. This paper-supported film retained 13% of the ethanol in separating a 2% ethanol solution in water with a flow rate of 56.8 gal./ft.² day.

EXAMPLE H

A paper-supported film (of the polymer of Example 9) prepared as described in Example A retained 13% of the ethanol from a 2% ethanol solution in water with a flow rate of 14 gal./ft.² day at 1600 p.s.i.

EXAMPLE I

A paper-supported film of the polymer from Example 4 retained 26% of the copper from a 2% cupric chloride solution with a flow rate of 6 gal./ft.² day at 1600 p.s.i.

EXAMPLE J

To a 7% solution (in chloroform) of the polymer made according to Example 7, was added 1.0% cupric chloride crystals based on the polymer. This was stirred at room temperature for 2 days, and filtered to remove the undissolved cupric chloride. The solvent was removed and the polymer dried in vacuo. Analysis of the polymer showed a 7.4% complexation of the cupric chloride.

The embodiments of the invention in which an exclusive property or privilege is claimed are defined as follows:

1. A polymer of the structure

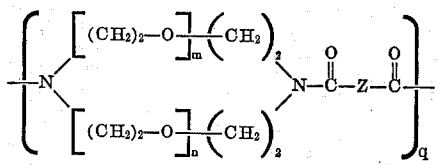

wherein:
   $m$ and $n$, alike or different, are 1 to 5;
   $q$ is 25 to 1000; and
   Z is selected from:
      divalent hydrocarbon groups containing from 2 to 20 carbon atoms,
      hydrocarbondioxy groups, —O—Z'—O—, containing from 2 to 20 carbon atoms, and
      hydrocarbondiamino groups, —NH—Z'—NH—, containing from 2 to 20 carbon atoms; said Z and Z' groups being composed of divalent aliphatic groups, arylene groups or combinations thereof.

2. A polymer according to claim 1, wherein Z is a divalent hydrocarbon group containing from 2 to 20 carbon atoms.

3. A polymer according to claim 2,

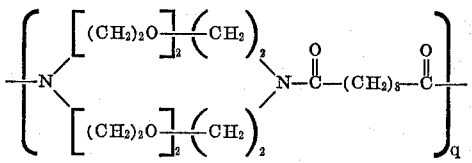

wherein $q$ is between 25 to 1000.

4. A polymer according to claim 2,

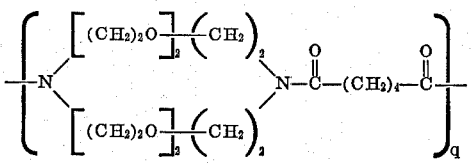

wherein $q$ is between 25 to 1000.

5. A polymer according to claim 2,

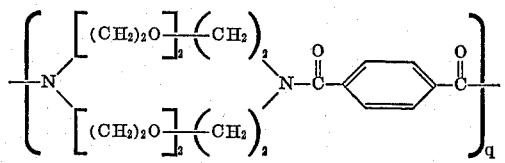

wherein $q$ is between 25 to 1000.

6. A polymer according to claim 2,

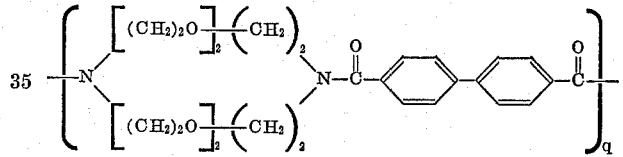

wherein $q$ is between 25 to 1000.

7. A polymer according to claim 2,

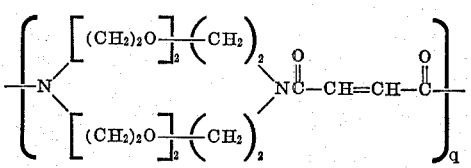

wherein $q$ is between 25 to 1000.

8. A polymer according to claim 2,

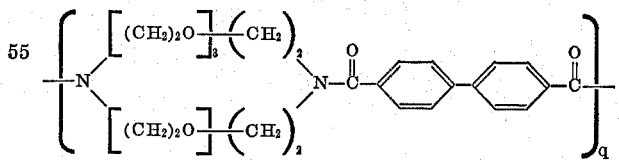

wherein $q$ is between 25 to 1000.

9. A polymer according to claim 1, wherein Z is a hydrocarbondioxy group containing from 2 to 20 carbon atoms.

10. A polymer according to claim 9,

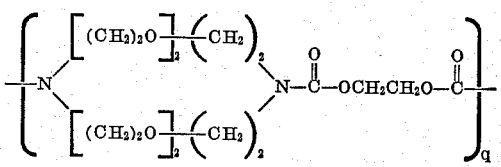

wherein $q$ is between 25 to 1000.

11. A polymer according to claim 1, wherein Z is a hydrocarbondiamino group containing from 2 to 20 carbon atoms, being composed of divalent aliphatic groups, arylene groups or combinations thereof.

12. A polymer according to claim 11, wherein Z is composed of a combination of aliphatic and arylene groups.

13. A polymer accoridng to claim 12,

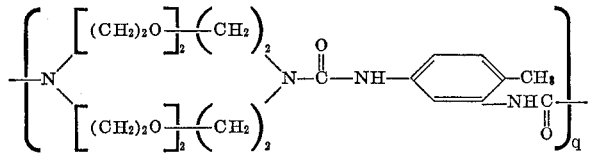

wherein $q$ is between 25 to 1000.

14. A polymer according to claim 12,

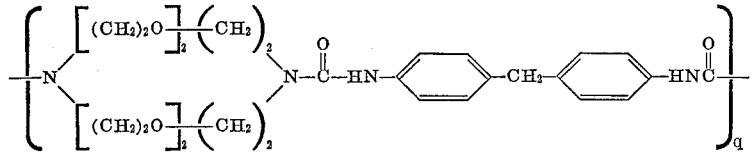

wherein $q$ is between 25 to 1000.

15. A copolymer containing random units of a polymer according to claim 1, and an aliphatic diamino polyether-containing polymer.

16. A copolymer according to claim 15, containing random units of

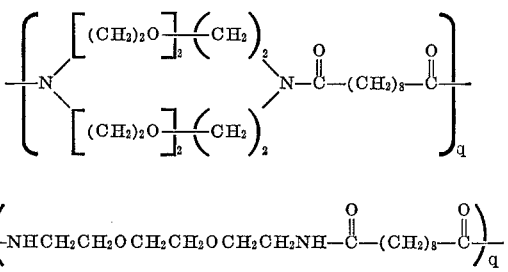

and $$-\left(\text{NHCH}_2\text{CH}_2\text{O CH}_2\text{CH}_2\text{O CH}_2\text{CH}_2\text{NH}-\overset{\text{O}}{\underset{\|}{\text{C}}}-(\text{CH}_2)_8-\overset{\text{O}}{\underset{\|}{\text{C}}}\right)_q$$

wherein $q$ is between 25 to 1000.

References Cited

UNITED STATES PATENTS 3,503,939  3/1970  Williams _____ 260—78

OTHER REFERENCES

Dietrich et al.: Tetrahedron Letters, vol. 34, 1969, pp. 2885–2888.

DONALD E. CZAJA, Primary Examiner

H. S. COCKERAM, Assistant Examiner

U.S. Cl. X.R.

210—38; 260—77.5 AM, 77.5 CH, 78 R, 78 UA